Aug. 23, 1938.      U. SPARKS      2,128,022
FURROW OPENING ATTACHMENT FOR CORN PLANTERS
Filed Sept. 23, 1937      2 Sheets-Sheet 1
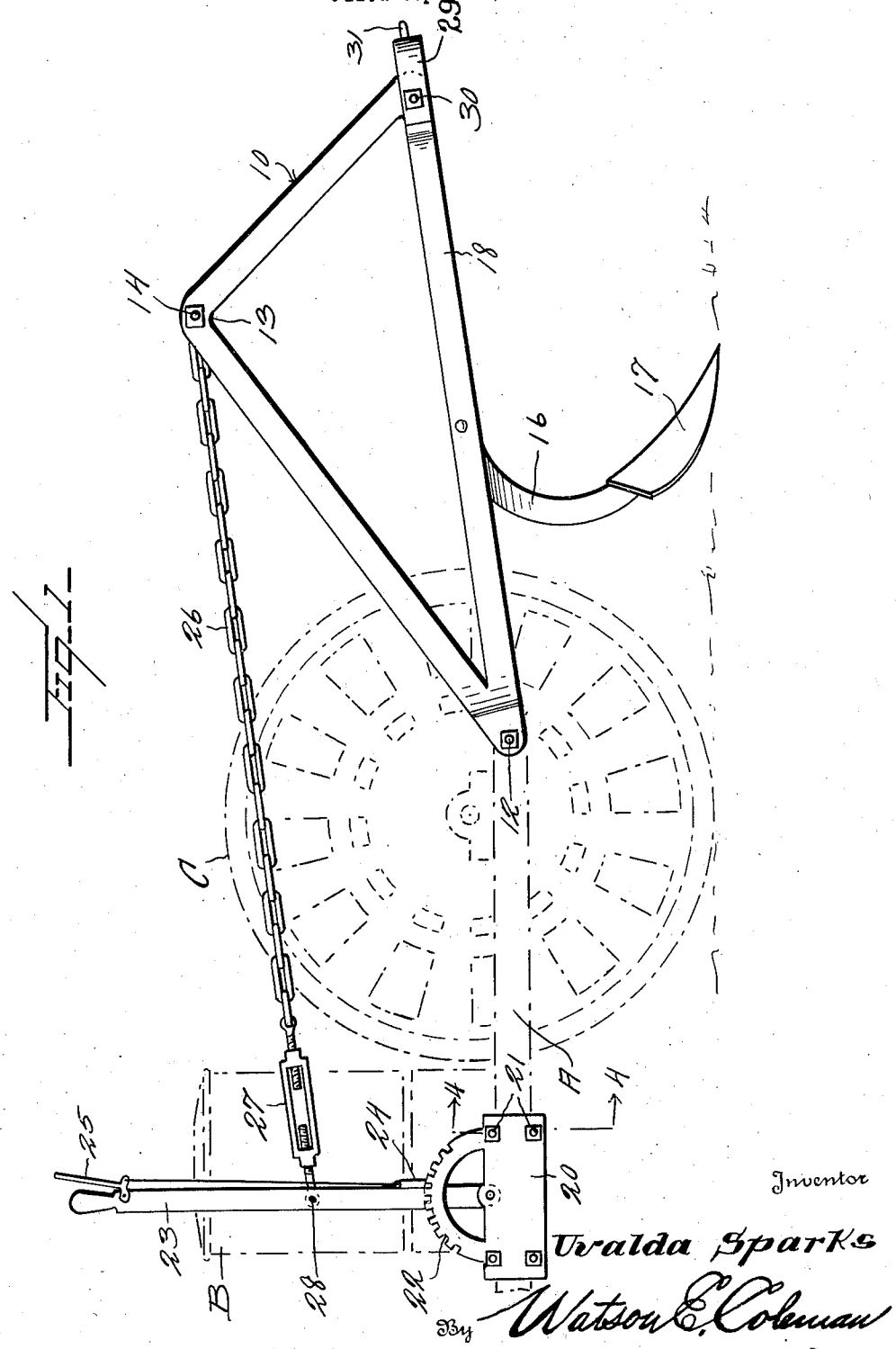
Inventor
Uralda Sparks
By Watson E. Coleman
Attorney

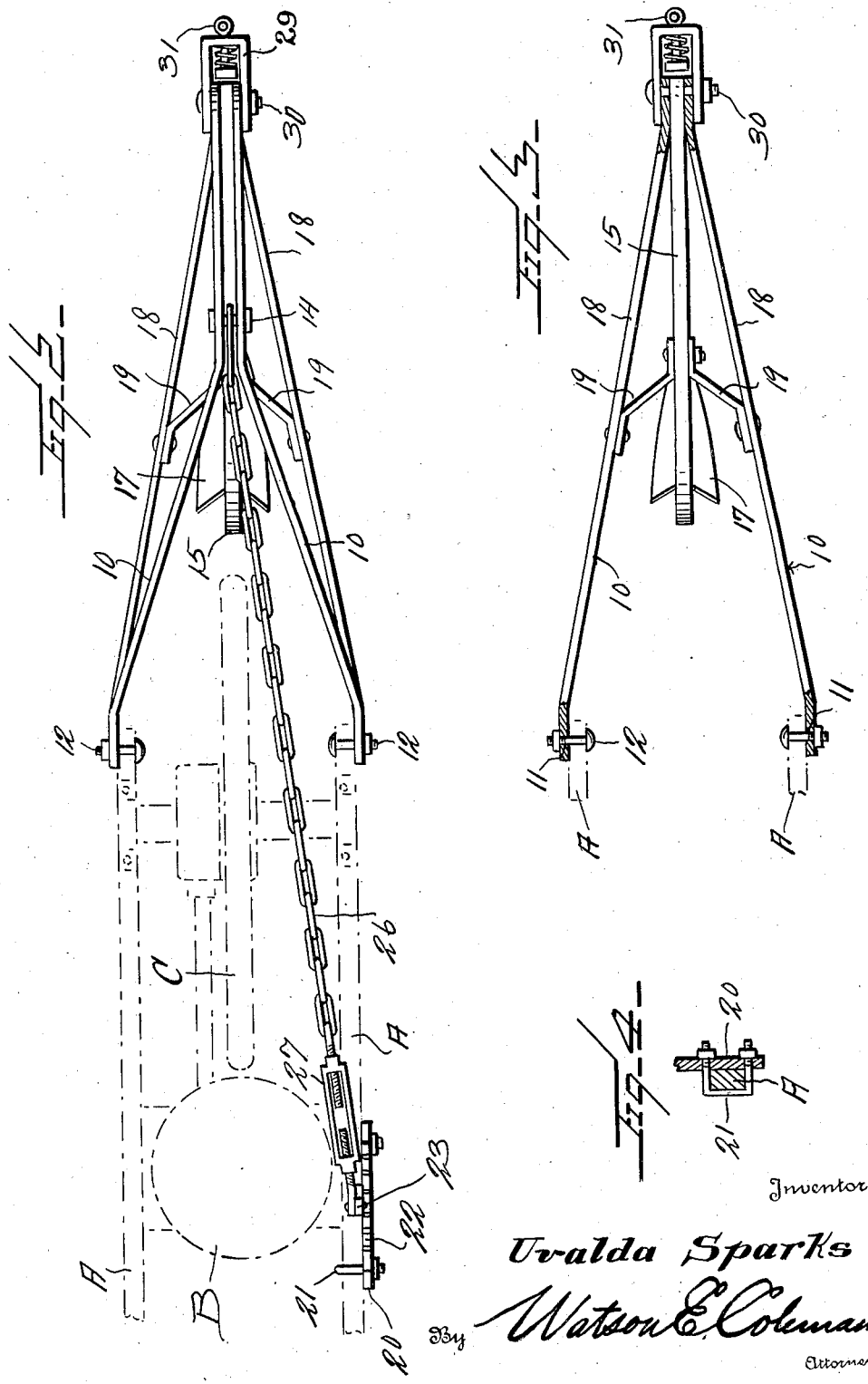

Patented Aug. 23, 1938

2,128,022

UNITED STATES PATENT OFFICE 2,128,022

FURROW OPENING ATTACHMENT FOR CORN PLANTERS

Uvalda Sparks, Sparta, Tenn., assignor of fifty percent to Waymon M. Mitchell, Sparta, Tenn.

Application September 23, 1937, Serial No. 165,398

3 Claims. (Cl. 97—225)

This invention relates to means for opening furrows and particularly to a furrow opening device adapted to be attached to and operated in conjunction with a corn planter.

The general object of the invention is to provide an attachment of this kind which may be applied to the frames of ordinary corn planters and which will support a plow in advance of the planter so that the seeds may be planted in the furrow, thus providing a device which will enable one man to do the work of two.

A further object is to provide means whereby the attachment may be adjusted for making either a deep furrow or a shallow furrow as desired, and whereby the attachment can be raised for turning or moving from field to field whenever desired.

My invention is illustrated in the accompanying drawings wherein:

Fig. 1 is a side elevation of my invention, the planter being shown in dotted lines.

Fig. 2 is a top plan view thereof, the planter being shown in dotted lines.

Fig. 3 is a horizontal section through the attachment.

Fig. 4 is a section through the planter frame bars and the toothed segment mounted thereon.

Referring to these drawings, it will be seen that I have illustrated a portion of an ordinary corn planter having the laterally disposed frame beams A, the can B and the forward wheel C.

My attachment includes two laterally disposed frames designated generally 10, each frame having the form of a scalene triangle. These frames are pivotally connected at 11 to the forward ends of the beams A by means of bolts or equivalent devices 12. These frames in use converge upward so that the apices 13 of the two triangular frames closely approximate each other and are held to each other by a bolt 14 or like element. These two frames 10 also converge forward towards each other, and disposed between the frames is a plow beam 15 which at its forward end is operatively connected to the frames, as will be later stated, and at its rear end extends downward and forward to form a plow foot 16 carrying the usual furrow opening plow 17. The beam 15 is braced from the bars 18, which constitute the bases of the two triangular frames 10, by means of the rearwardly and laterally extending braces 19 which are bolted respectively to the beam and to the bars 18 of the triangular frames.

Detachably mounted upon one of the frame beams A of the planter or drill is an angle iron 20 which is held to the frame beams by U-bolts 21, this member 20 having an arcuate rack bar 22 mounted thereon. Pivoted to this base portion 20 is a lever 23 having the usual latch 24 adapted to be engaged with any one of the teeth of the rack 22, this latch being liftable by means of the usual handle 25. Connected to the bolt 14 is a chain or other flexible element 26 which extends rearward and at its rear end is connected to a turnbuckle 27 in turn pivotally connected to the lever 23 at 28. By this means, the effective length of the connection between the bolt 14 and the lever may be adjusted.

The forward ends of the bars 18 of the triangular frames are connected to each other by means of an embracing clevis 29 through which a bolt 30 passes, and a spring hitch 31 is operatively engaged with this clevis. By this means, a tractor or a team of horses may be connected to the forward ends of the triangular frames 10 so as to draw the drill or planter over the ground with the frames 10 either raised or lowered.

It will be seen that when it is desired to move the planter from place to place without making a furrow, the lever 23 may be drawn backward so as to lift the plow entirely off the ground. It will also be seen that the plow may be lowered so as to plow either a shallow furrow or a deep furrow, as desired, and that the weight of the two frames 10 bearing down upon the plow will hold it to its work. By this means, the furrow in which the seed is to be planted can be made at the same time that the seed is planted. Of course, I do not wish to be limited to any particular make of planter or drill and the drawing is merely illustrative of the fact that my attachment may be applied to a drill or planter of any desired character.

What is claimed is:—

1. A furrow forming attachment for planters, including a pair of frames disposed in laterally registering position, each frame having the form of a scalene triangle, each frame at its rear end having means whereby it may be pivotally connected to a planter frame, the triangular frames being convergent upwardly and forwardly and bolted together at the apices of the frames, a plow beam having a foot and a plow, the beam being disposed between the forward ends of the convergent frames, braces connecting the basal portions of the triangular frames to the beam, means connecting the forward end of the beam to the forward ends of the frame, a lifting element having means whereby it may be detachably mounted upon the frame of the planter, and a flexible connection between the lifting element and the connected apices of the two triangular frames.

2. A furrow forming attachment for planters, including a pair of frames disposed in laterally registering position, each frame having the form of a scalene triangle and each frame at its rear end having means whereby it may be pivotally connected to a planter frame, the triangular frames being convergent upward and forward and being bolted together at their apices, a clevis embracing the forward ends of the frames and bolted thereto, a plow beam operatively connected at its forward end to the forward ends of the triangular frames, extending rearward therefrom and then downward and forward and carrying a plow, and braces bolted to the plow beam and to the basal portions of the triangular frames, an arcuate rack having means whereby it may be attached to a planter frame, a lever pivoted upon the rack and having a latch engaging the teeth thereof, and a flexible connection between the lever and the apices of the two triangular frames.

3. A furrow forming attachment for planters, including a pair of frames disposed in laterally registering position, each frame having the form of a scalene triangle and each frame at its rear end having means whereby it may be pivotally connected to a planter frame, the triangular frames being convergent upward and forward and being bolted together at their apices, a clevis embracing the forward ends of the frames and bolted thereto, a plow beam operatively connected at its forward end to the forward ends of the triangular frames, extending rearward therefrom and then downward and forward and carrying a plow, braces bolted to the plow beam and to the basal portions of the triangular frames, an arcuate rack having means whereby it may be attached to a planter frame, a lever pivoted upon the rack and having a latch engaging the teeth thereof, a chain connected to the apices of the two triangular frames and extending rearward therefrom, and a turnbuckle connecting the rear end of the chain to the lever.

UVALDA SPARKS.